(12) United States Patent
Funamoto

(10) Patent No.: US 12,393,270 B2
(45) Date of Patent: Aug. 19, 2025

(54) CONTROL APPARATUS, IMAGE PICKUP APPARATUS, CONTROL METHOD, AND STORAGE MEDIUM

(71) Applicant: CANON KABUSHIKI KAISHA, Tokyo (JP)

(72) Inventor: Shohei Funamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 205 days.

(21) Appl. No.: 18/353,177

(22) Filed: Jul. 17, 2023

(65) Prior Publication Data

US 2024/0028113 A1 Jan. 25, 2024

(30) Foreign Application Priority Data

Jul. 19, 2022 (JP) ................................. 2022-114914

(51) Int. Cl.
*G06F 3/01* (2006.01)
*H04N 23/63* (2023.01)
*H04N 23/611* (2023.01)

(52) U.S. Cl.
CPC ........... *G06F 3/013* (2013.01); *H04N 23/632* (2023.01); *H04N 23/611* (2023.01)

(58) Field of Classification Search
CPC ..... G06F 3/013; G06F 3/0304; H04N 23/632; H04N 23/611; H04N 23/63; H04N 23/633; H04N 23/635; H04N 23/672
See application file for complete search history.

(56) References Cited

U.S. PATENT DOCUMENTS

2015/0022682 A1* 1/2015 Seita .................... H04N 23/672
348/220.1

FOREIGN PATENT DOCUMENTS

JP 2021-034756 A 3/2021
JP 2021-105694 A 7/2021

* cited by examiner

*Primary Examiner* — Yogesh K Aggarwal
(74) *Attorney, Agent, or Firm* — Cowan, Liebowitz & Latman, P.C.

(57) ABSTRACT

A control apparatus includes a processor configured to detect a gaze point of a user on an image based on a visual line, acquire at least one feature area detected using the image, set at least one selection determining area each corresponding to one of the one feature area, select as a main object area a first feature area among the at least one feature area when the gaze point is included in the first feature area, select as the main object area a second feature area corresponding to one selection determining area including the gaze point in a case where the gaze point is not included in the at least one feature area and the gaze point is included in the at least one selection determining area, and set a condition in selecting the main object area using information on the at least one feature area.

17 Claims, 15 Drawing Sheets

CONTROL APPARATUS, IMAGE PICKUP APPARATUS, CONTROL METHOD, AND STORAGE MEDIUM

BACKGROUND

Technical Field

One of the aspects of the embodiments relates generally to a control apparatus, an image pickup apparatus, a control method, and a storage medium, and more specifically to a technology to assist a user in selecting a main object.

Description of Related Art

Some conventionally known image pickup apparatuses include an interface configured to detect a visual line position (gaze point) of a user who is viewing an imaging screen (image) and to select a main object among a plurality of objects on the imaging screen according to his visual line. These image pickup apparatuses employ the technology for selecting an area corresponding to the visual line as a main object area among a plurality of object areas with unrestricted positions and sizes. Japanese Patent Laid-Open No. 2021-34756 discloses a configuration that assists the user in selecting a small object based on the visual line by enlarging an object area corresponding to an object whose image is smaller than a threshold on the imaging screen. Japanese Patent Laid-Open No. 2021-105694 discloses a configuration for selecting as a main object area an object area included in an object selection range.

However, none of Japanese Patent Laid-Open Nos. 2021-34756 and 2021-105694 disclose a solution for object selection in a case where a plurality of objects exist near the gaze point.

SUMMARY

A control apparatus according to one aspect of the disclosure includes a memory storing instructions, and a processor configured to execute the instructions to detect a gaze point of a user on an image based on a visual line of the user, acquire at least one feature area detected using the image, set at least one selection determining area each corresponding to one of the one feature area, select as a main object area a first feature area among the at least one feature area in a case where the gaze point is included in the first feature area, select as the main object area a second feature area corresponding to one selection determining area including the gaze point in a case where the gaze point is not included in the at least one feature area and the gaze point is included in the at least one selection determining area, and set a condition in selecting the main object area using information on the at least one feature area. An image pickup apparatus having the above control apparatus, a control method corresponding to the above control apparatus, and a storage medium storing a program that causes a computer to execute the above control method also constitute another aspect of the disclosure.

Further features of the disclosure will become apparent from the following description of embodiments with reference to the attached drawings.

DESCRIPTION OF THE EMBODIMENTS

Figure 1A:
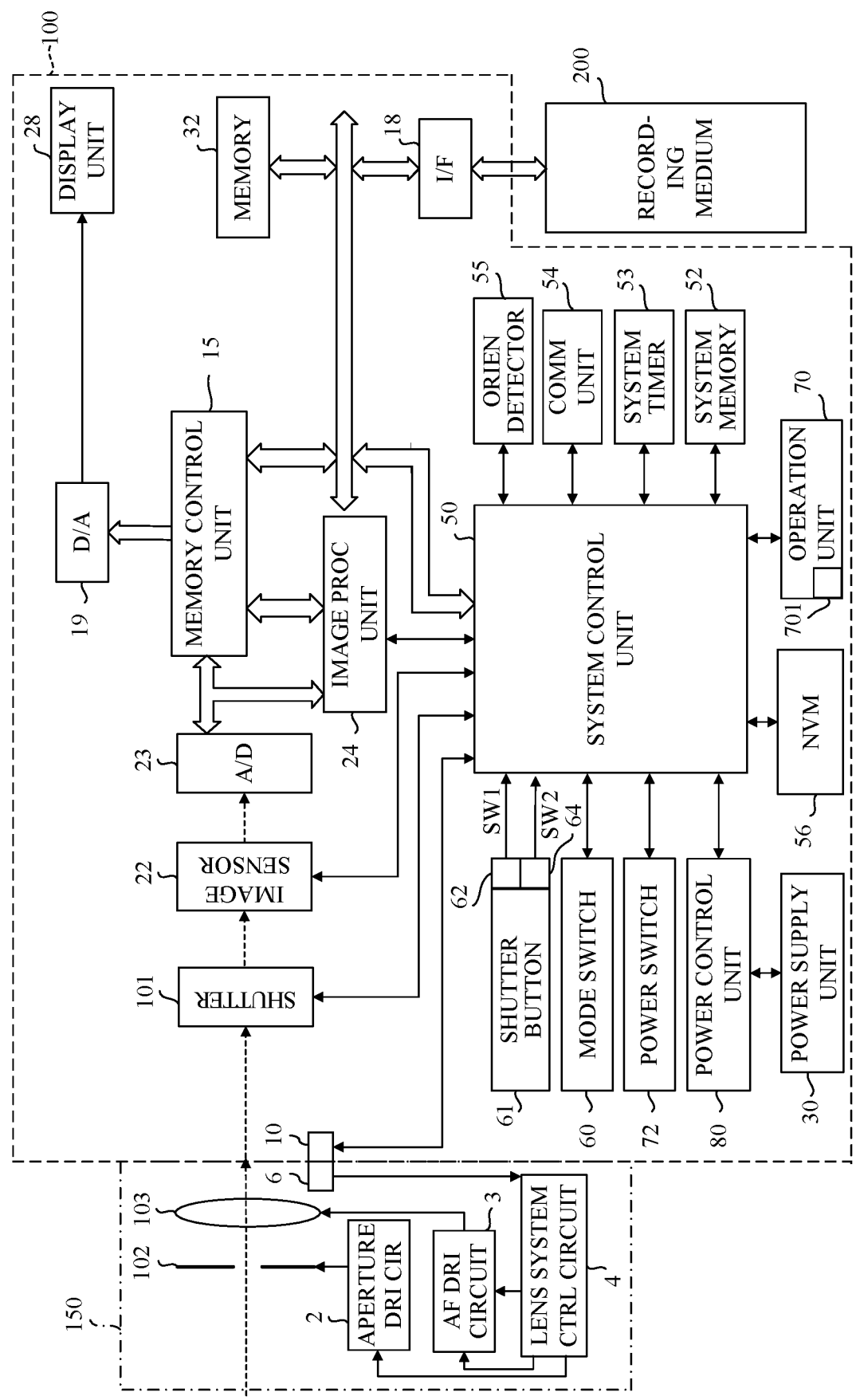
FIGS. 1A and 1B are block diagrams of a digital camera as an example of an image pickup apparatus according to a first embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

In each of the following embodiments, a lens interchangeable type digital camera to which the disclosure is applied will be described. However, the disclosure is applicable to any electronic apparatus that includes a visual line detection function and an imaging function. Such an electronic apparatus includes a video camera, a computer device (a personal computer, a tablet computer, a media player, a PDA, etc.), a mobile phone, a smart phone, a game machine, a robot, a drone, a drive recorder, and the like. These are merely illustrative, and the disclosure can be applied to other electronic apparatus. The disclosure is also applicable to a configuration in which the visual line detection function and the imaging function are provided in separate devices that can communicate with each other (such as a body and a remote controller).

First Embodiment

FIG. 1A is a block diagram of a digital camera as an example of an image pickup apparatus according to this embodiment. The digital camera includes a (camera) body 100 and a lens unit 150 is attachable to and detachable from the body 100. The digital camera is a lens interchangeable type digital camera according to this embodiment, but may be a lens integrated type digital camera.

The lens unit 150 includes an aperture driving circuit 2, an AF driving circuit 3, a lens system control circuit 4, a communication terminal 6, an aperture stop (diaphragm) 102, and a lens unit 103. In a case where the lens unit 150 is attached to the body 100, the communication terminal 6 contacts a communication terminal 10 provided on the body 100. The lens unit 150 receives power from the body 100 via the communication terminals 6 and 10. The lens system control circuit 4 can bidirectionally communicate with a system control unit 50 provided in the body 100 via the communication terminals 6 and 10.

The lens unit 103 forms an imaging optical system including a plurality of lenses including movable lenses. The movable lenses include a focus lens. The movable lenses may further include a magnification varying lens and an image stabilizing lens.

The AF driving circuit 3 includes a motor, an actuator, etc. that move the focus lens. The lens system control circuit 4 controls the AF driving circuit 3 to move the focus lens. The aperture driving circuit 2 includes a motor, an actuator, and the like for moving the aperture stop 102. The lens system control circuit 4 controls the aperture driving circuit 2 in order to adjust the F-number (aperture value) (opening amount) of the aperture stop 102.

The body 100 includes the communication terminal 10, a memory control unit 15, an interface (I/F) 18, a digital-to-analog (D/A) converter 19, an image sensor 22, an analog-to-digital (A/D) converter 23, an image processing unit 24, a display unit 28, a power supply unit 30, a memory 32, a system control unit 50, a system memory 52, and a system timer 53. The body 100 further includes a communication unit 54, an orientation detector 55, a nonvolatile memory (NVM) 56, a mode switch 60, a shutter button 61, an operation unit 70, a power switch 72, a power control unit 80, and a mechanical shutter 101.

The system control unit 50 moves the mechanical shutter 101 and adjusts the exposure time of the image sensor 22. The mechanical shutter 101 is kept fully open during moving image capturing.

Figure 1B:
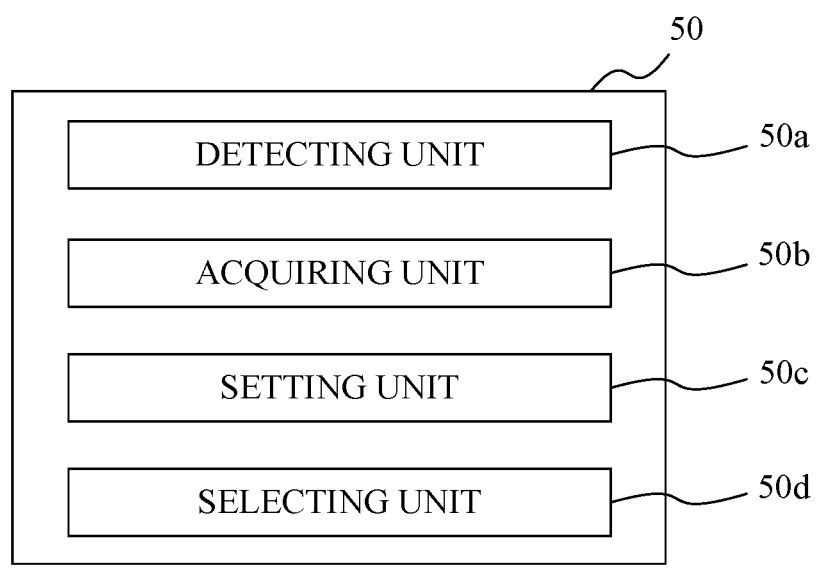

The system control unit (processor) 50 also includes a detecting unit 50a, an acquiring unit 50b, a setting unit 50c, and a selecting unit 50d, as illustrated in FIG. 1B. The detecting unit 50a detects a gaze point (visual line position of the user who is viewing the imaging screen) in the image based on the visual line of the user. The acquiring unit 50b acquires at least one feature area (such as a face or body of a creature such as a human or an animal, or a vehicle) detected using the image. The setting unit 50c sets at least one selection determining area each corresponding to one of at least one feature area. The setting unit 50c sets a condition in selecting one feature area (main object area) using information on the at least one feature area for various controls or for acquiring object information. The condition for the selecting unit 50d to select the main object area includes, for example, the size of the selection determining area and the priority of the feature area. The selecting unit 50d selects as the main object area a first feature area among the at least one feature area in a case where the gaze point is included in the first feature area. In a case where the gaze point is not included in at least one feature area and the gaze point is included in at least one selection determining area, the selecting unit 50d selects as the main object area a second feature area corresponding to one selection determining area including the gaze point. Although the system control unit 50 is mounted in the body 100 in this embodiment, it may be configured as a control apparatus different from the body 100.

The image sensor 22 includes, for example, a CCD image sensor or a CMOS image sensor. A plurality of pixels are two-dimensionally arranged on the image sensor 22, and each pixel is provided with one microlens, one color filter, and one or more photoelectric converters. In this embodiment, each pixel is provided with a plurality of photoelectric converters, and a signal can be read out for each photoelectric converter. By configuring the pixels in this manner, the signals read out of the image sensor 22 can be used to generate a captured image, a parallax image pair, and an image signal for phase difference AF.

The A/D converter 23 converts an analog image signal output from the image sensor 22 into a digital image signal (image data). The A/D converter 23 may be provided in the image sensor 22.

Figure 2A:
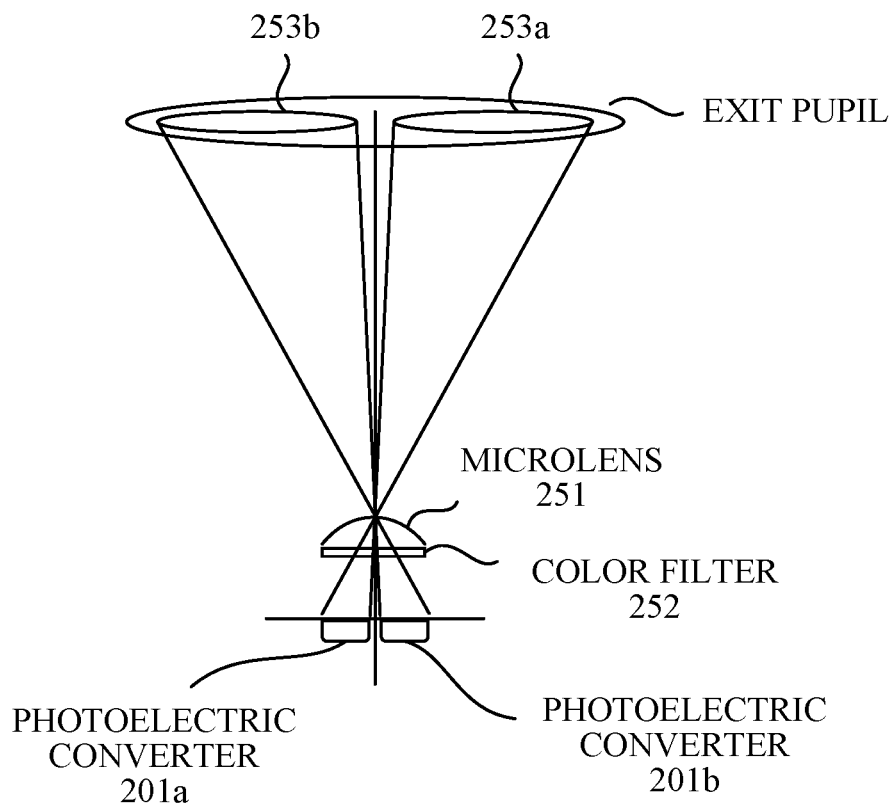
FIGS. 2A and 2B illustrate an example of a correspondence relationship between an exit pupil and a photoelectric converter in the first embodiment.

FIG. 2A schematically illustrates a correspondence relationship between the exit pupil of the lens unit 150 and each photoelectric converter in a case where each pixel included in the image sensor 22 includes two photoelectric converters 201a and 201b. The photoelectric converters 201a and 201b share a single color filter 252 and a single microlens 251. Light passing through a partial area 253a of the exit pupil enters the photoelectric converter 201a, and light passing through a partial area 253b of the exit pupil enters the photoelectric converter 201b. Therefore, for pixels included in a certain pixel area, an image formed by the signal read out of the photoelectric converter 201a and an image formed by the signal read out of the photoelectric converter 201b form a parallax image pair. The parallax image pair can be used as image signals (A image signal and B image signal) for the phase difference AF. Adding the signals read out of the photoelectric converters 201a and 201b for each pixel can provide a normal image signal (captured image).

Figure 2B:
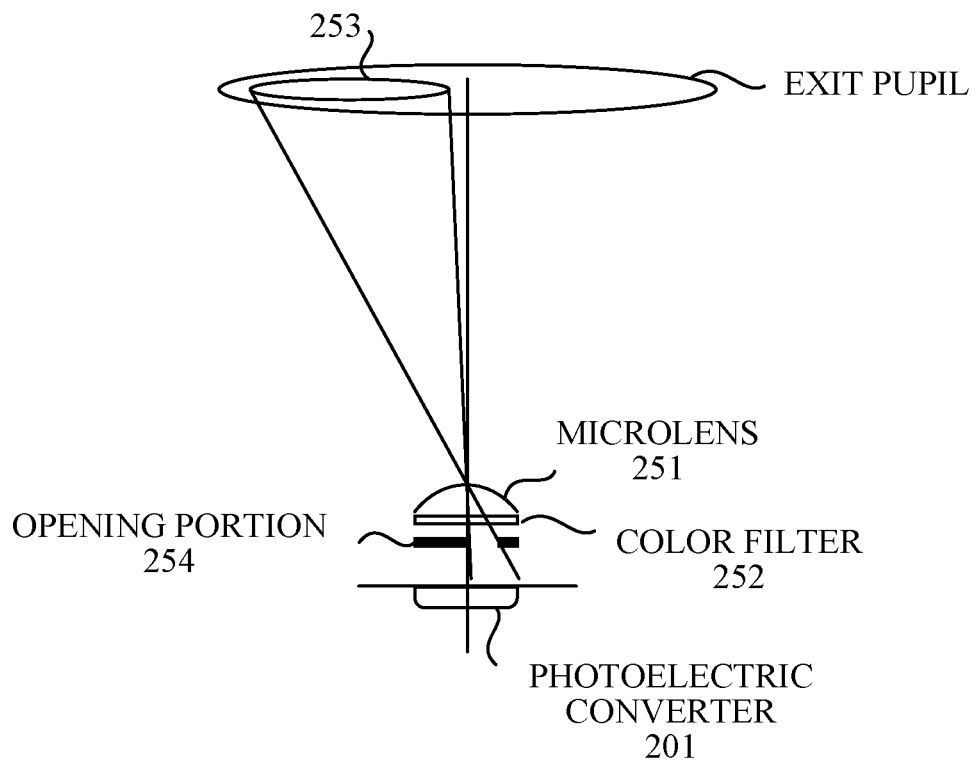

In this embodiment, each pixel of the image sensor 22 is used as both a pixel (focus detecting pixel) for generating an image signal for the phase difference AF, and a pixel (imaging pixel) for generating the normal image signal. However, the image sensor 22 may be configured such that some pixels function as focus detecting pixels and other pixels function as imaging pixels. FIG. 2B illustrates an example of a correspondence relationship between an exit pupil area 253 through which incident light passes and the focus detecting pixel through an opening portion 254. A photoelectric converter 201 included in the focus detecting pixels in FIG. 2B functions similarly to the photoelectric converter 201b in FIG. 2A. In fact, a focus detecting area with a substantially arbitrary position and size can be set by dispersing the focus detecting pixels of FIG. 2B and another focus detecting pixel that includes a photoelectric converter that functions similarly to the photoelectric converter 201a of FIG. 2A.

In FIGS. 2A and 2B, the image sensor for obtaining an image for recording is used as a sensor for the phase difference AF, but the AF method is not limited as long as a focus detecting area with unrestricted size and position is available. For example, the embodiment can be implemented with the contrast AF. Only the contrast AF is used, each pixel includes a single photoelectric converter.

The image data (RAW image data) output from the A/D converter 23 is processed by the image processing unit 24 as necessary, and then stored in the memory 32 through the memory control unit 15. The memory 32 is used as a buffer memory for temporarily storing image data and audio data, or as a video memory for the display unit 28.

The image processing unit 24 applies predetermined image processing to image data, generates signals and image data, and acquires and/or generates various types of information. The image processing unit 24 may include, for example, a dedicated hardware circuit such as an ASIC designed to implement a specific function, or a processor such as a DSP executing software to perform the specific function.

Here, the image processing applied by the image processing unit 24 includes preprocessing, color interpolation processing, correction processing, detection processing, data processing, evaluation value calculation processing, and the like. The preprocessing includes signal amplification, reference level adjustment, defective pixel correction, and the like. The color interpolation processing is processing for interpolating values of color components that are not included in image data, and is also called demosaicing processing. The correction processing includes white balance adjustment, image luminance correction processing, correction processing of optical aberration of the lens unit 150, color correction processing, and the like. The detection processing includes detection and tracking processing of a feature area (such as a face and body of a creature such as a human or an animal, or a vehicle), recognition processing of a specific human or animal previously registered in the body 100, and the like. The data processing includes scaling processing, encoding and decoding processing, header information generation processing, and the like. The evaluation value calculation processing includes calculation processing of a pair of image signals for the phase difference AF, an evaluation value for the contrast AF, an evaluation value for auto-exposure control, and the like. These are merely examples of image processing that can be performed by the image processing unit 24, and are not intended to limit the image processing that the image processing unit 24 can perform. The evaluation value calculation processing may be performed by the system control unit 50.

The D/A converter 19 generates an analog signal suitable for display on the display unit 28 from the image data for display stored in the memory 32 and supplies it to the display unit 28. The display unit 28 includes, for example, a liquid crystal display apparatus, and performs display based on an analog signal from the D/A converter 19.

The display unit 28 can be made to function as an electronic viewfinder (EVF) by continuously imaging moving images and displaying the captured moving images. The moving image displayed so that the display unit 28 functions as the EVF is called a live-view image. The display unit 28 may be provided inside the body 100 so as to be observable through the eyepiece unit, or may be provided on a housing surface of the body 100 so as to be observable without using the eyepiece unit. The display unit 28 may be provided both inside the body 100 and on the housing surface.

The system control unit 50 includes, for example, a CPU (MPU, also called a microprocessor). The system control unit 50 controls the operations of the body 100 and the lens unit 150 by reading programs stored in the nonvolatile memory 56 into the system memory 52 and by executing them. The system control unit 50 controls the operation of the lens unit 150 by transmitting various commands to the lens system control circuit 4 using communication through the communication terminals 6 and 10.

The nonvolatile memory 56 may be rewritable. The nonvolatile memory 56 stores programs executed by the system control unit 50, various setting values of the body 100 and the lens unit 150, GUI (Graphical User Interface) image data, and the like. The system memory 52 includes a main memory that is used in a case where the system control unit 50 executes programs.

As part of its operation, the system control unit 50 performs auto-exposure control (AE) processing based on evaluation values generated by the image processing unit 24 or the system control unit 50, and determines an imaging condition. The imaging condition includes, for example, a shutter speed, an F-number, and sensitivity for still image capturing. The system control unit 50 determines one or more of the shutter speed, the F-number, and the sensitivity according to the set AE mode. The system control unit 50 controls the F-number of the aperture stop 102 via the lens system control circuit 4. The system control unit 50 also controls operations of the mechanical shutter 101.

The system control unit 50 moves the focus lens based on the evaluation value or the defocus amount generated by the image processing unit 24 or the system control unit 50, and performs autofocus (AF) processing.

The system timer 53 is a built-in clock and is used by the system control unit 50.

The operation unit 70 includes a plurality of input devices (buttons, switches, dials, etc.) that are operable by the user. Some of the input devices have names according to their assigned functions. The mode switch 60, the shutter button 61, and the power switch 72 are included in the operation unit 70 although they are illustrated separately from the operation unit 70. In a case where the display unit 28 is a touch display, the touch panel is also included in the operation unit 70. Operations on input devices are monitored by the system control unit 50. Upon detecting an operation on the input device, the system control unit 50 executes processing according to the detected operation.

The shutter button 61 includes a first shutter switch (SW1) 62 that turns on in a case where the shutter button 61 is half-pressed, and a second shutter switch (SW2) 64 that turns on in a case where the shutter button 61 is fully pressed. In a case where the system control unit 50 detects that SW1 is turned on, the system control unit 50 executes a preparatory operation for imaging a still image. The preparatory operation includes AE processing, AF processing, and the like. In a case where the system control unit 50 detects that SW2 is turned on, the system control unit 50 performs still image capturing and a recording operation according to the imaging condition determined in the AE processing.

Figure 3:
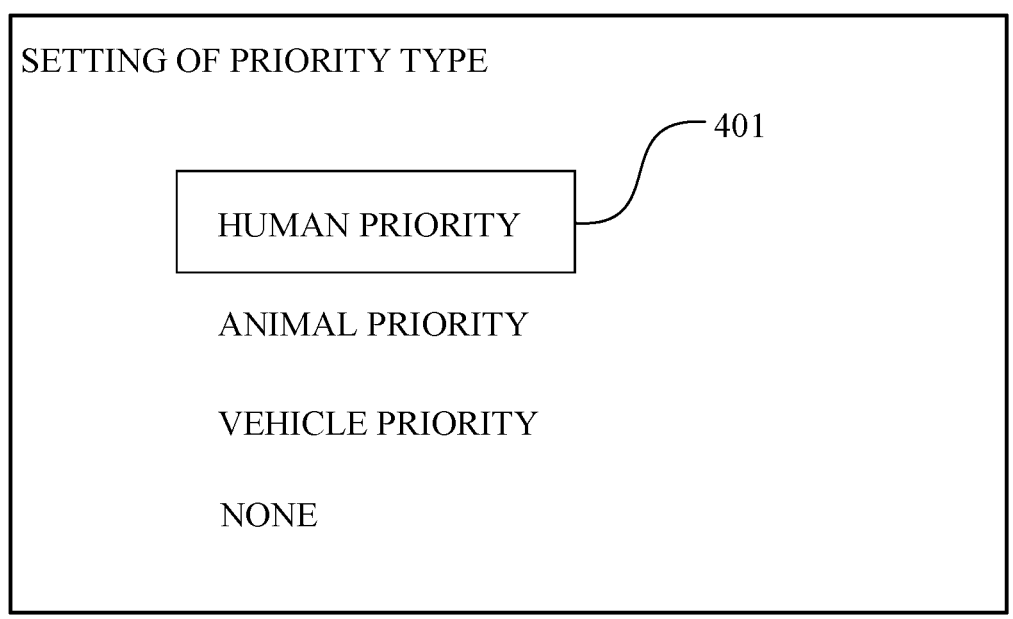
FIG. 3 illustrates an example of a setting screen for switching priority types.

The mode switch 60 is an operation unit for switching and setting a type of a feature area detectable by the image processing unit 24 to be preferentially selected as the main object. FIG. 3 illustrates an example of a setting screen for switching priority types using the mode switch 60. In this embodiment, priority type 401 can be selected from four types: a human priority, an animal priority, a vehicle priority, and none.

The operation unit 70 further includes a visual line detector 701 that is used to detect a visual line direction of the user. The visual line detector 701 is not a member directly operated by the user, but the visual line direction detected using the visual line detector 701 is treated as an input.

Figure 4A:
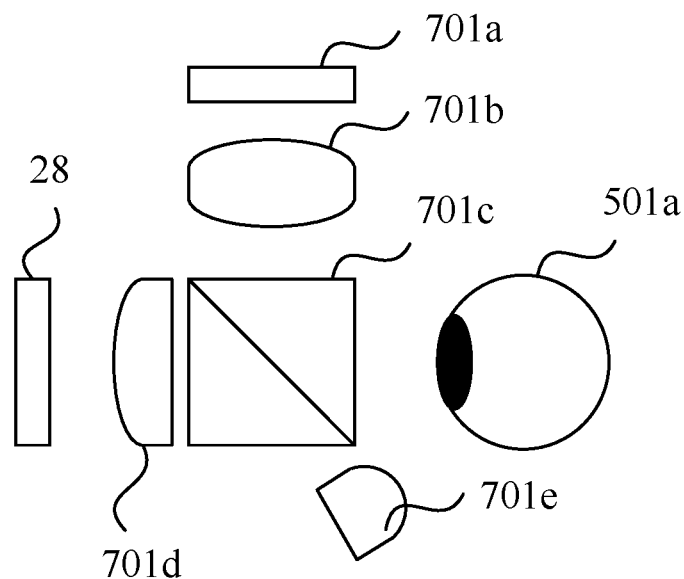
FIGS. 4A and 4B schematically illustrate configuration examples of a visual line detector.

FIG. 4A schematically illustrates a configuration example of the visual line detector 701 provided in the viewfinder. The visual line detector 701 is used to detect as the visual line direction a rotation angle of the optical axis of an eyeball 501a of the user who is viewing the display unit 28 provided inside the body 100 through the eyepiece unit of the viewfinder. The detected visual line direction can detect the position on the display unit 28 that the user is gazing at (gaze point in the image).

For example, a live-view image is displayed on the display unit 28, and the user can observe the display contents on the display unit 28 through an eyepiece lens 701d and a dichroic mirror 701c by looking into the window of the eyepiece unit. A light source 701e can emit infrared light in the window direction of the eyepiece unit (outward direction of the body 100). In a case where the user is looking through the viewfinder, the infrared light emitted by the light source 701e is reflected by the eyeball 501a and returns to the viewfinder. The infrared light incident on the viewfinder is reflected by the dichroic mirror 701c toward a light receiving lens 701b.

The light receiving lens 701b forms an infrared eyeball image on an imaging plane of an image sensor 701a. The image sensor 701a is a two-dimensional image sensor having an infrared light imaging filter. The number of pixels of the image sensor 701a for visual line detection may be smaller than that of the image sensor 22 for imaging. An eyeball image captured by the image sensor 701a is transmitted to the system control unit 50. The system control unit 50 detects a corneal reflection position of infrared light and a pupil position from the eyeball image, and detects the visual line direction from the positional relationship between them. The system control unit 50 also detects the position on the display unit 28 that the user is gazing at based on the detected visual line direction. The corneal reflection position and the pupil position may be detected by the image processing unit 24 using the eyeball image, and the system control unit 50 may acquire these positions from the image processing unit 24.

Figure 4B:
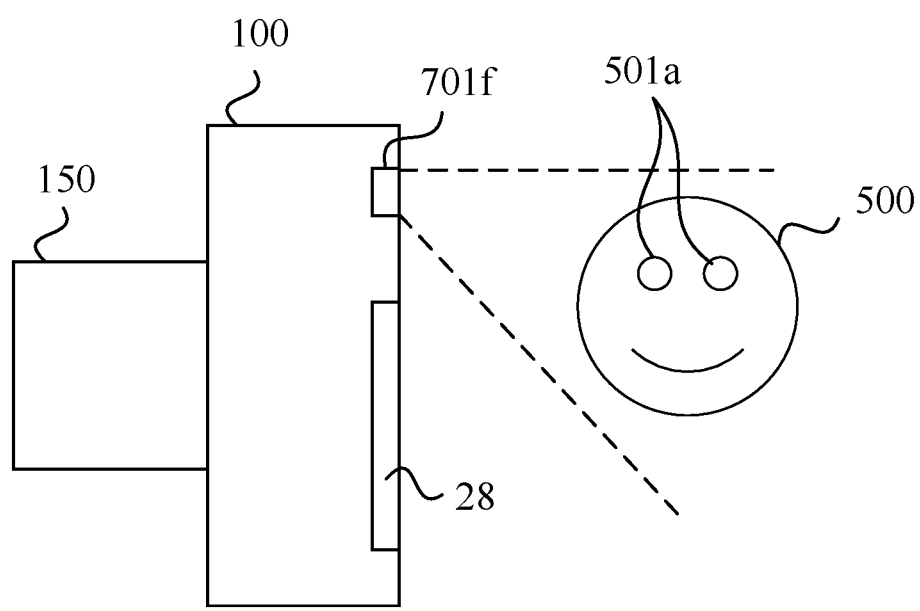

The disclosure does not depend on a detecting method of the visual line direction or the configuration of the visual line detector. Therefore, the configuration of visual line detector 701 is not limited to that illustrated in FIG. 4A. For example, as illustrated in FIG. 4B, the visual line direction may be detected based on a captured image obtained by a camera 701f disposed near the display unit 28 provided on the rear surface of the body 100. The angle of view of the camera 701f indicated by a dotted line is determined so as to capture the face of the user who captures an image while viewing the display unit 28. The visual line direction can be detected based on the image of the eye area detected from the captured image obtained by the camera 701f. In using a captured image of infrared light, the light source 701e disposed near the camera 701f may be used to project the infrared light onto an object within the angle of view to capture an image. The method of detecting the visual line direction from the acquired captured image is similar to the configuration of FIG. 4A. In using a captured image of visible light, the light is not projected. In using a captured image of visible light, the visual line direction can be detected from the positional relationship between the inner corner of the eye area and the iris, and the like.

The power control unit 80 includes a battery detection circuit, a DC-DC converter, a switch circuit for switching between blocks to be energized, and the like, and detects whether or not a battery is installed, the type of battery, and a remaining battery amount. The power control unit 80 controls the DC-DC converter based on the detection result and the instruction from the system control unit 50, and supplies necessary voltage to each component including a recording medium 200 for a necessary period. The power supply unit 30 includes a battery, an AC adapter, and the like.

The I/F 18 is an interface with the recording medium 200 such as a memory card or hard disk drive. The recording medium 200 records data files such as captured images and sounds. The data file recorded on the recording medium 200 can be read through the I/F 18 and played back through the image processing unit 24 and the system control unit 50.

The communication unit 54 realizes communication with an external device by at least one of wireless communication and wired communication. Images captured by the image sensor 22 (including live view images) and images recorded on the recording medium 200 can be transmitted to the external device through the communication unit 54. Image data and other various information can be received from the external device through the communication unit 54.

The orientation detector 55 includes, for example, an acceleration sensor or an angular velocity sensor, and detects the orientation of the body 100 relative to the gravity direction. The system control unit 50 can record orientation information corresponding to the orientation detected by the orientation detector 55 during imaging in a data file that stores image data obtained by the imaging. The orientation information can be used, for example, to display a recorded image in the same orientation as in a case where it was captured.

The body 100 can perform various controls so that the feature area detected by the image processing unit 24 becomes a proper image. The control includes, for example, autofocus (AF) to focus on the feature area, auto-exposure control (AE) to properly expose the feature area, automatic white balance to properly set the white balance of the feature area, and automatic flash light amount adjustment for properly setting the brightness of the feature area. The disclosure is not limited to this example. For example, the image processing unit 24 may detect an area determined to match a predetermined feature using a live-view image as a feature area, and outputs information such as the position, size, and reliability of each feature area to the system control unit 50.

The feature area can be used to detect object information. In a case where the feature area is a face area, object information can be detected, such as whether or not a red-eye phenomenon occurs, whether or not the eyes are closed, facial expression (such as a smile), and the like.

This embodiment assists the user in selecting one feature area (referred to as a main object area hereinafter) from a plurality of feature areas for various controls or for acquiring object information, using a visual line. The detected visual line of the user will be referred to as a visual line input hereinafter.

A feature of visual line input is an unstable direction of the visual line due to the fact that it is derived from the living body. Even if the user intends to focus on a certain point, his eyeball may move minutely or may unconsciously change the visual line. Therefore, in order to detect a gaze point in a displayed image, it is necessary to statistically process visual line directions detected over a certain period of time. Accordingly, noise reduction processing is performed based on a plurality of gaze points detected in a predetermined period to smooth the gaze points.

Figure 5:
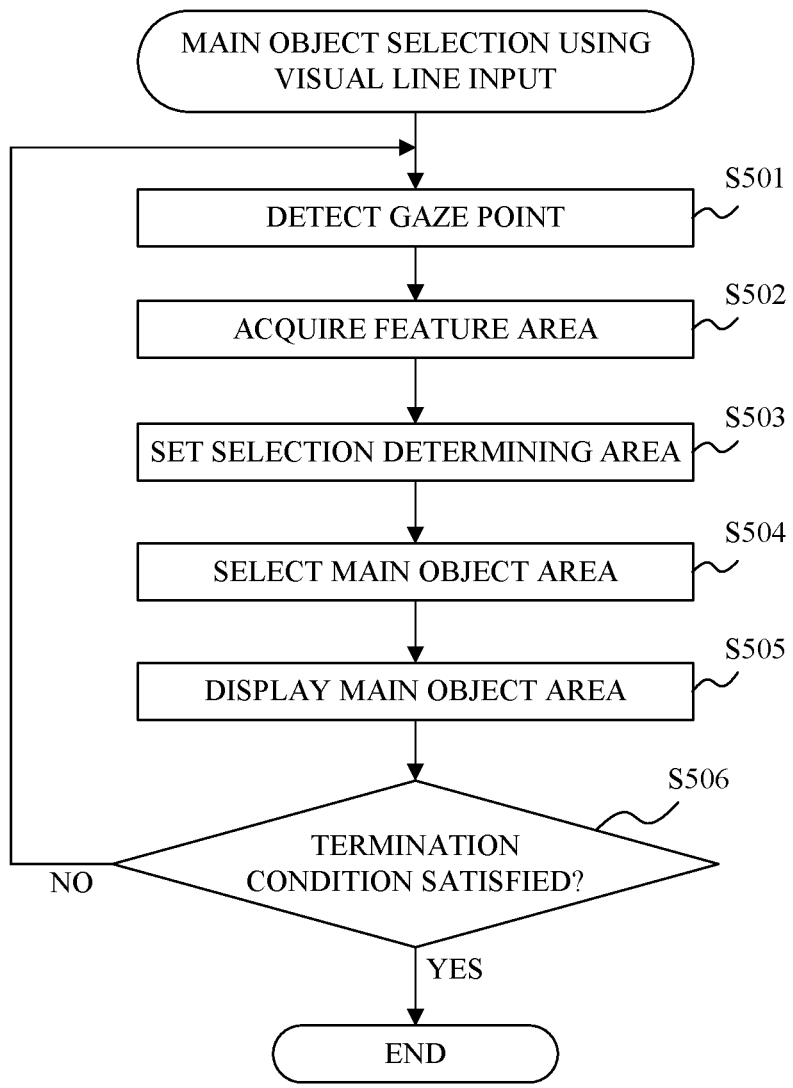
FIG. 5 is a flowchart illustrating main object selection processing using visual line input according to the first embodiment.

Referring now to FIG. 5, a description will be given of the operation of selecting a main object using visual line input according to this embodiment. FIG. 5 is a flowchart illustrating main object selection processing by visual line input according to the present embodiment. For example, in a case where a live-view image is displayed on the display unit 28 in the imaging standby state, the selection operation of the main object can be performed in parallel with the generation and display of the live-view image.

In step S501 (detection step), the system control unit 50 (detecting unit 50*a*) acquires the visual line direction detected by the visual line detector 701. The system control unit 50 performs averaging processing in the visual line direction to detect the position (gaze point) in the display unit 28 or live-view image that the user is gazing at.

In step S502 (acquisition step), the system control unit 50 (acquiring unit 50*b*) acquires the feature area detected by the image processing unit 24. The image processing unit 24 outputs the number of detected feature areas and information (for example, size, position, reliability, etc.) of each feature area to the system control unit 50. The feature area is not limited to a human face, and may be a human body area, pupil area, animal face area, animal whole body area, vehicle area, pattern matching, or the like. Alternatively, the image processing unit 24 may only detect a candidate for the feature area.

In step S503 (setting step), the system control unit 50 (setting unit 50*c*) sets a selection determining area for each feature area acquired in step S502. The selection determining area is an area that is used to determine main object selection using a visual line in the next step S504. The size of the selection determining area to be set is adjusted according to information on the feature area (such as a gaze point and an imaging condition) in order to increase consistency with the intention of the user in selecting an object using the visual line input.

In step S504 (selection step), the system control unit 50 (selecting unit 50*d*) determines whether or not the gaze point of the user detected in step S501 is included in the feature area or selection determining area. The system control unit 50 selects the main object area from the feature areas acquired in step S502 based on the determination result.

In step S505, the system control unit 50 sets the main object area selected in step S504. More specifically, a rectangular frame indicating the main object area is superimposed on the live-view image on the display unit 28 and displayed.

In step S506, the system control unit 50 determines whether or not a termination condition is satisfied, such as detection of turning-on of SW1 or turning-on of SW2, or failure of detection of the visual line direction. In a case where it is determined that the termination condition is satisfied, the flow ends by assuming that the main object determined at that time has been selected. In a case where it is determined that the end condition is not satisfied, the flow returns to step S501.

Figure 6:
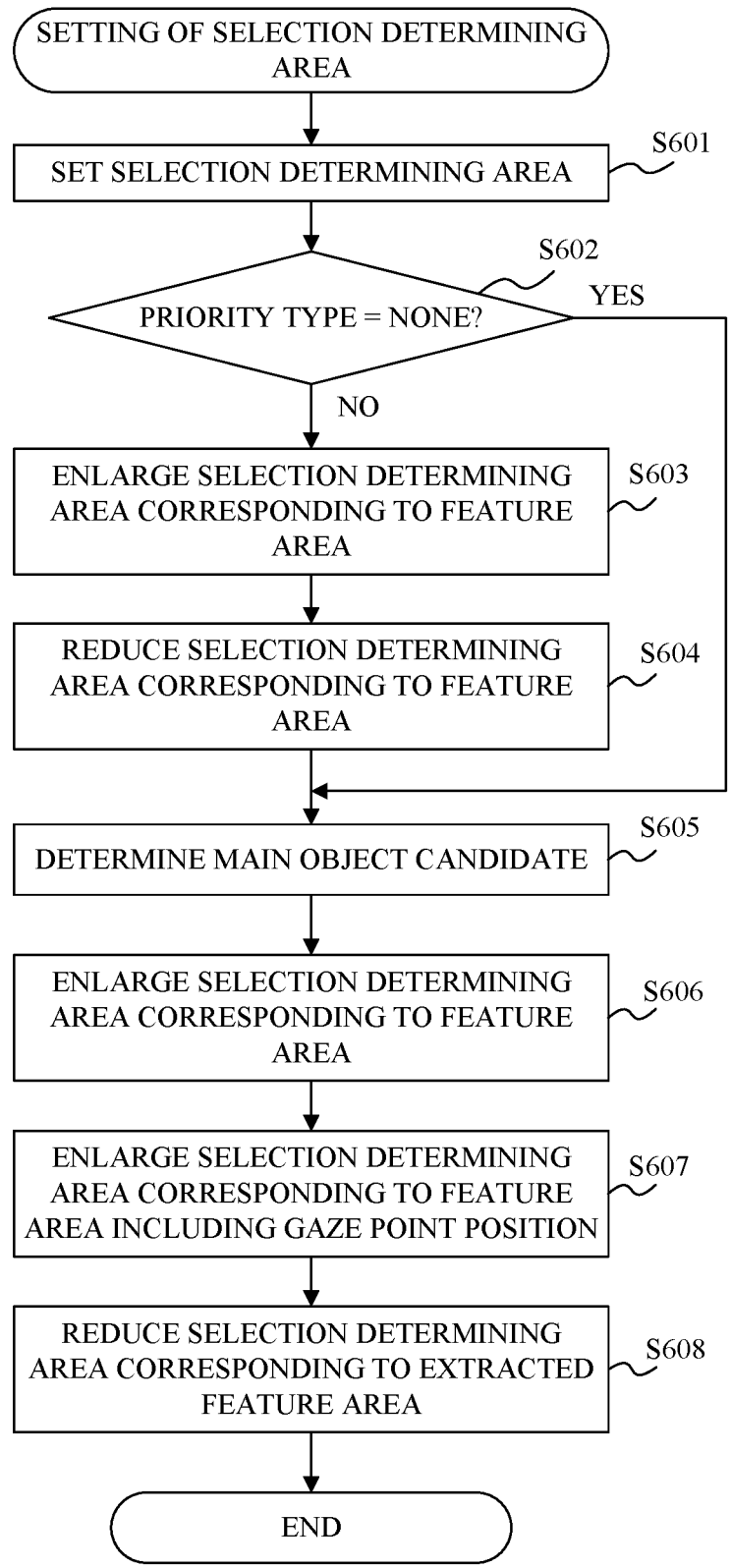
FIG. 6 is a flowchart illustrating processing for setting a selection determining area according to the first embodiment.

Referring now to FIGS. 6 to 9, a description will be given of a method for setting the selection determining area. FIG. 6 is a flowchart illustrating processing for setting the selection determining area in step S503.

In step S601, the system control unit 50 sets a selection determining area for each feature area. The size of the selection determining area to be set is the size obtained by enlarging the corresponding feature area by a predetermined ratio.

Figure 7A:
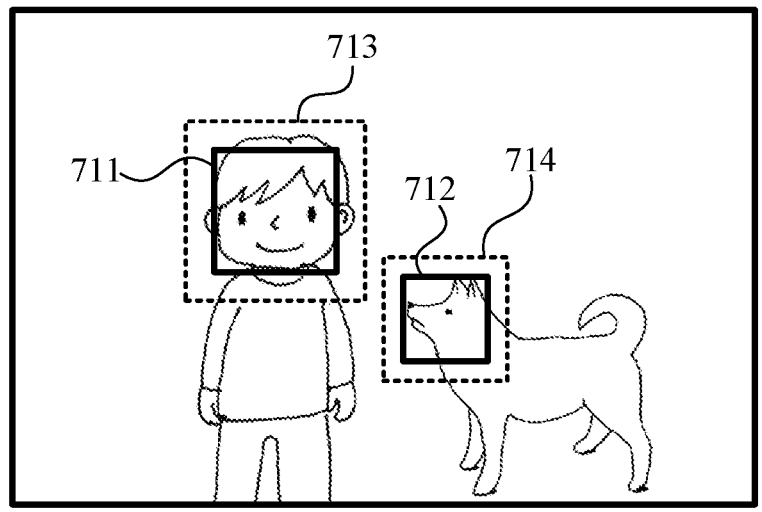
FIGS. 7A, 7B, and 7C explain the adjustment of the selection determining area based on the priority type setting.

FIG. 7A illustrates that the selection determining areas are set for two feature areas of a human face area 711 and an animal face area 712 acquired in step S502. A selection determining area 713 is set to the human face area 711 and has a size obtained by enlarging the human face area 711 by the predetermined ratio. A selection determining area 714 is set to the animal face area 712 and has a size obtained by enlarging the animal face area 712 by the predetermined ratio.

In step S602, the system control unit 50 determines whether the setting of the priority type 401 is "none." In a case where it is determined that the setting of the priority type 401 is "none," the flow proceeds to step S605, and in a case where it is determined that the setting of the priority type 401 is not "none," the flow proceeds to step S603.

In step S603, the system control unit 50 expands the selection determining area corresponding to the specific area of the type included in the priority type 401 by a predetermined ratio. For example, in a case where the priority type 401 is "human priority," the selection determining area corresponding to the feature area acquired as a human is enlarged. However, in a case where the enlargement of the selection determining area collides with another feature area on the image, further enlargement of the area in that direction is stopped.

Figure 7B:
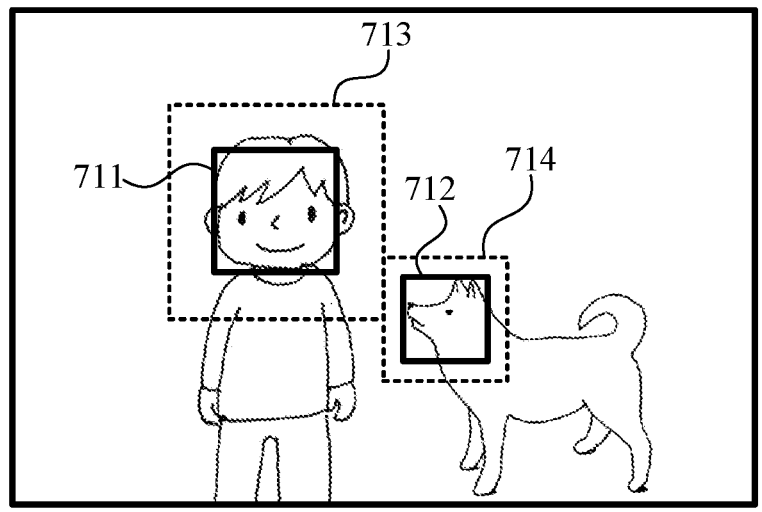

FIG. 7B illustrates the result of enlarging the selection determining area 713 corresponding to the human face area 711 relative to FIG. 7A.

In step S604, the system control unit 50 reduces the selection determining area corresponding to the feature area of the type not included in the priority type 401 by the predetermined ratio. For example, in a case where the priority type 401 is "human priority," the selection determining area corresponding to the feature area acquired as a non-human (animal or vehicle) is reduced. However, in a case where the selection determining area becomes smaller than the corresponding feature area due to the reduction of the selection determining area, the selection determining area is set to the equivalent size with the feature area.

Figure 7C:
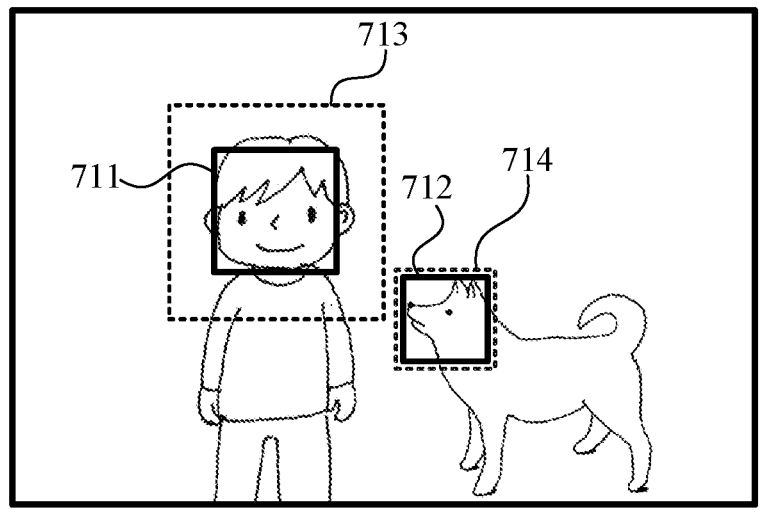

FIG. 7C illustrates the result of reducing the selection determining area 714 corresponding to the animal face area 712 relative to FIG. 7A.

In step S605, the image processing unit 24 determines a feature area that is a main object candidate. The main object candidate is, for example, a person previously registered in the body 100, a person holding a ball in a sports scene, or an object that has been continuously framed for a predetermined time or longer.

Figure 8A:
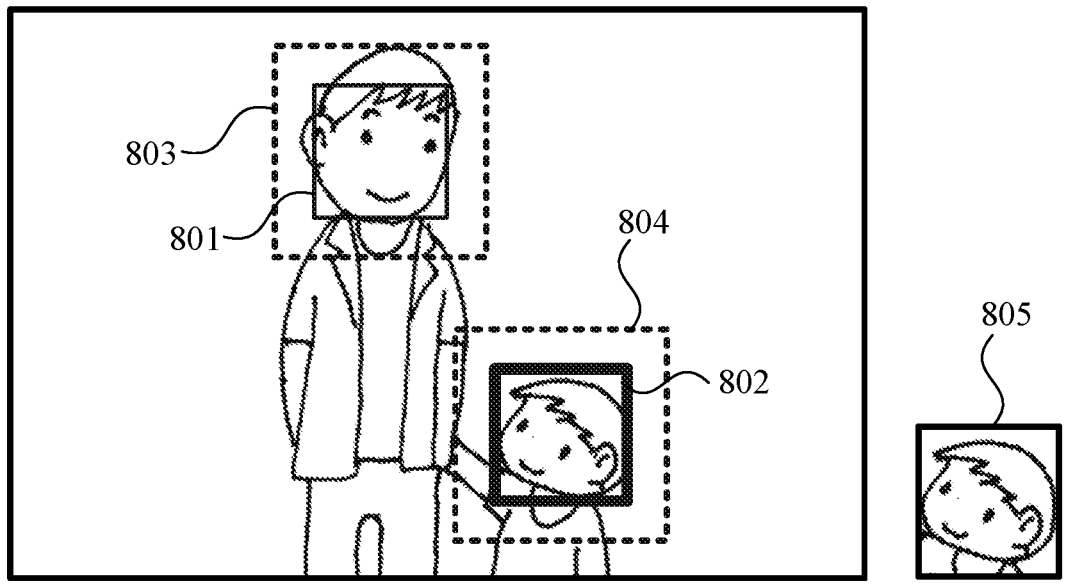
FIGS. 8A and 8B explain the adjustment of the selection determining area based on main object candidate determination.

FIG. 8A illustrates that among human face areas 801 and 802 acquired in step S502, the human face area 802 that matches a main object candidate image 805 previously registered in the body 100 is determined as the main object candidate. A selection determining area 803 is a selection determining area set to the human face area 801, and a selection determining area 804 is a selection determining area set to the human face area 802.

In step S606, the system control unit 50 expands the selection determining area corresponding to the feature area determined as the main object candidate in step S605 by a predetermined ratio. However, in a case where the selection determining area collides with another feature area on the image due to the enlargement of the selection determining area, further enlargement of the selection determining area in that direction is stopped.

Figure 8B:
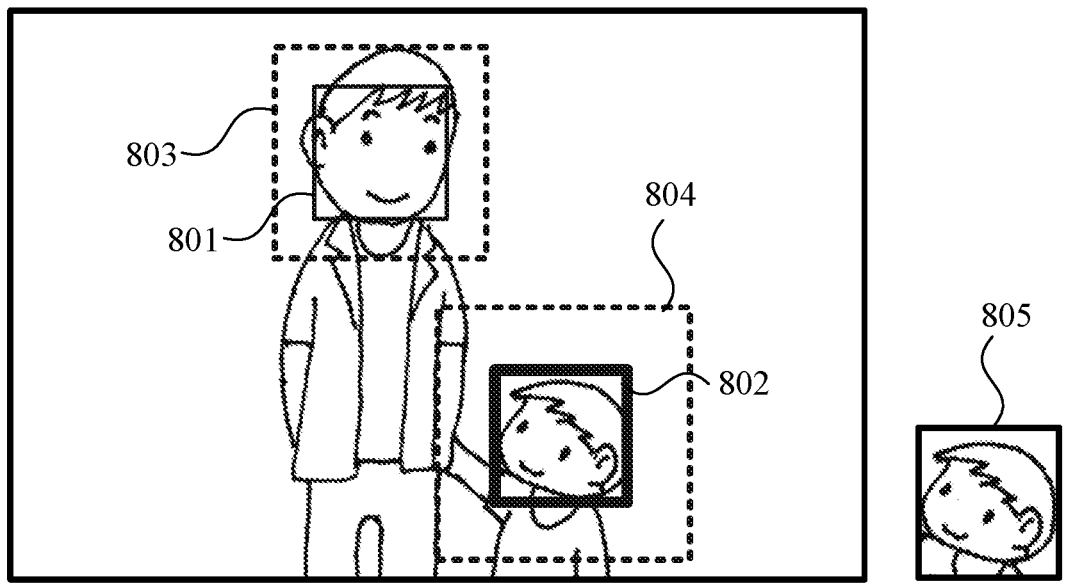

FIG. 8B illustrates the result of enlarging the selection determining area 804 corresponding to the human face area 802, which is the main object candidate.

In step S607, the system control unit 50 expands the selection determining area corresponding to the feature area containing the gaze point detected in step S501. However, in a case where the selection determining area collides with another feature area on the image due to the enlargement of the selection determining area, further enlargement of the area in that direction is stopped.

Figure 9:
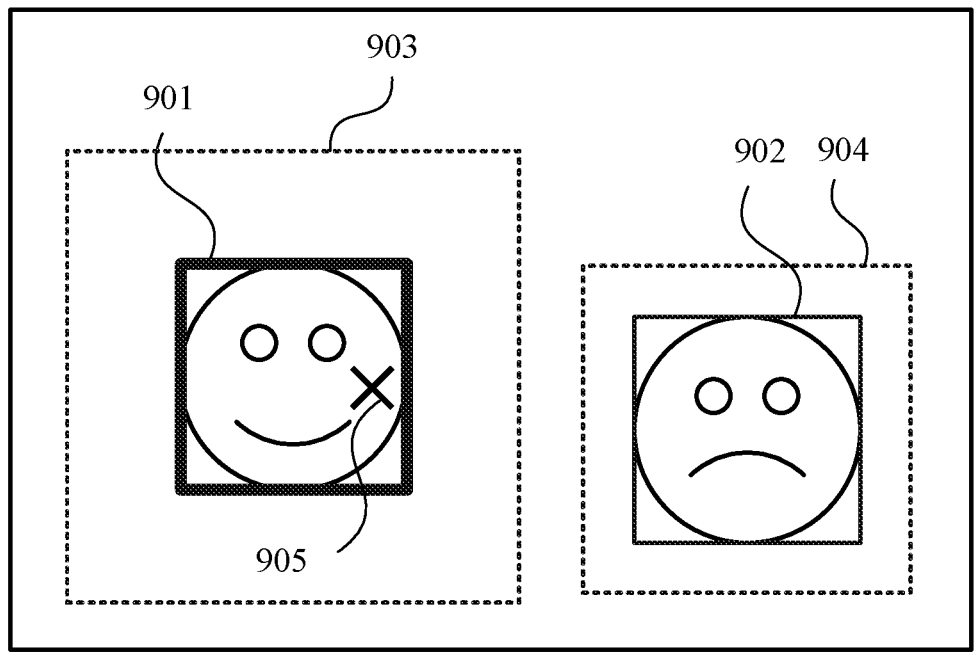
FIG. 9 explains the adjustment of selection determining area based on a gaze point.

FIG. 9 explains adjustment of selection determining area based on gaze point. In FIG. 9, a feature area 901 among two feature areas 901 and 902 acquired as a human face includes a gaze point 905. Therefore, among selection determining areas 903 and 904 corresponding to the feature areas 901 and 902, the selection determining area 903 corresponding to the feature area 901 including the gaze point 905 is enlarged.

In step S608, the system control unit 50 first extracts one of the feature areas acquired in step S502 that was selected as the main object area in the past frame, and then the selection was canceled within the last predetermined frames (within a predetermined period of time). Next, the system control unit 50 reduces the selection determining area corresponding to the extracted feature area. However, in a case where the selection determining area becomes smaller than the corresponding feature area due to the reduction of the selection determining area, the selection determining area is set to the equivalent size with the feature area.

The setting method of the selection determining area described above can expand the selection determining area corresponding to the feature area that is likely to match the main object intended by the user, and reduce the selection determining area corresponding to the feature area that is unlikely to match the main object intended by the user. Thereby, consistency can be improved with the intention of the user in the object selection using visual line input.

Referring now to FIGS. 6 to 9, a description will be given of the setting method of the selection determining area. FIG. 6 is a flowchart illustrating processing for setting the selection determining area in step S503.

Figure 10:
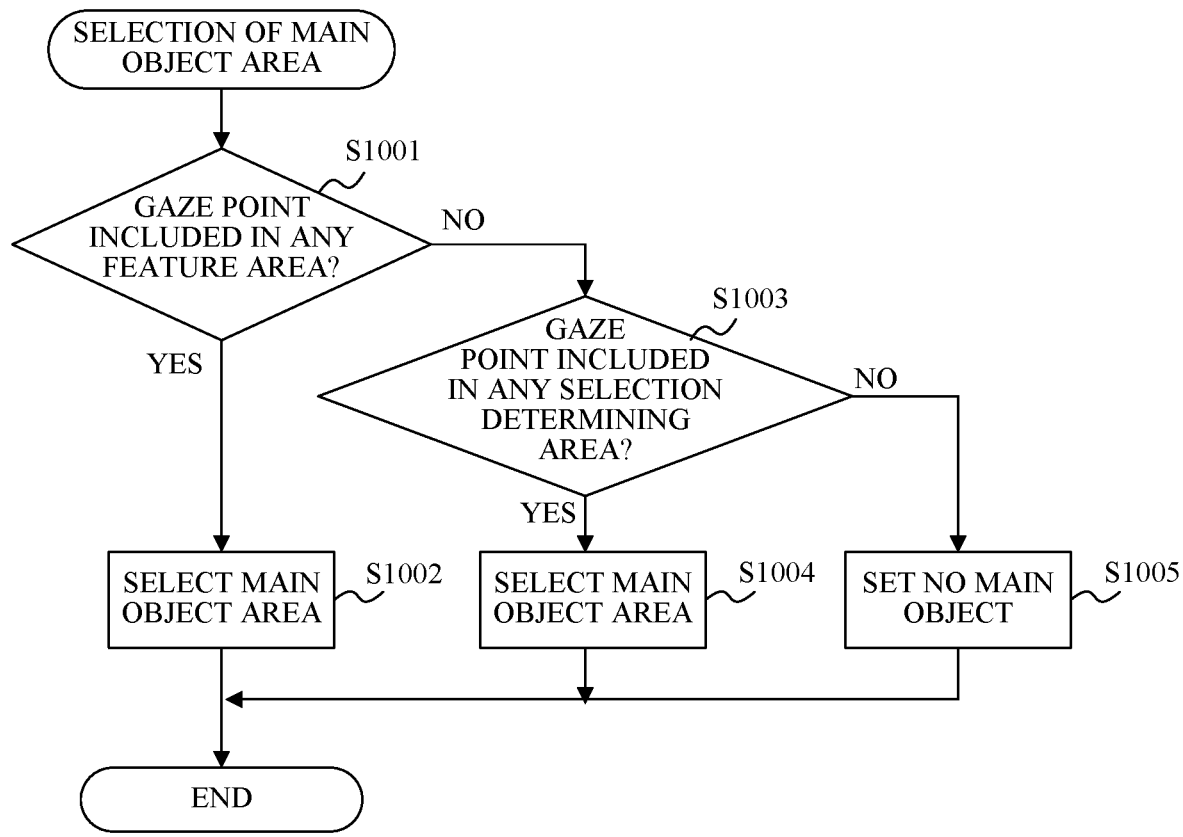
FIG. 10 is a flowchart illustrating selection processing of the main object area according to the first embodiment.
Figure 11A:
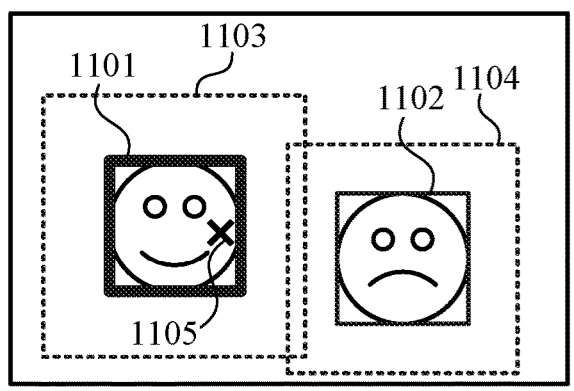
FIGS. 11A to 11D explain a main object area selected based on the gaze point in the first embodiment.
Figure 11B:
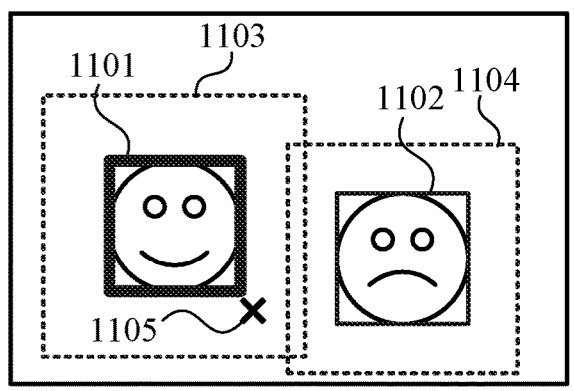
Figure 11C:
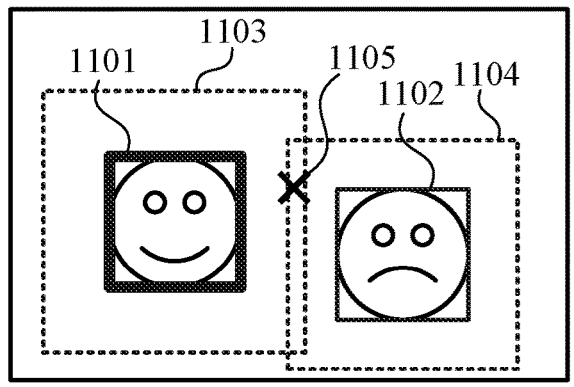
Figure 11D:
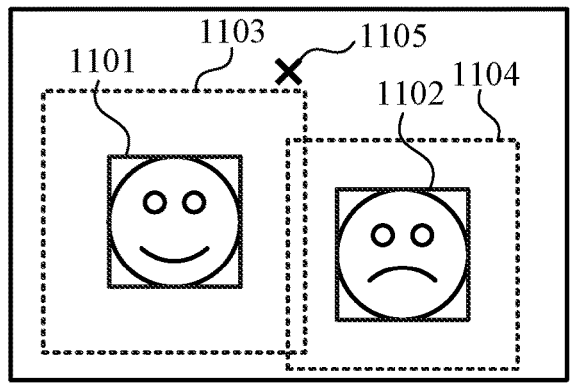

Referring now to FIGS. 10 to 11D, a description will be given of a method for selecting a main object. FIG. 10 is a flowchart illustrating the main object area selection processing in step S504.

In step S1001, the system control unit 50 determines whether or not the gaze point detected in step S501 is included in any feature area acquired in step S502. In a case where it is determined that the gaze point is included in any feature area, the flow proceeds to step S1002; otherwise, the flow proceeds to step S1003.

In step S1002, the system control unit 50 selects the feature area determined to include the gaze point in step S1001 as the main object area.

FIGS. 11A to 11D explain the main object area selected based on the gaze point. In FIGS. 11A to 11D, a feature area 1101 among two feature areas 1101 and 1102 acquired as a human face includes a gaze point 1105. Therefore, the feature area 1101 is selected as the main object area, as illustrated in FIG. 11A. A selection determining area 1103 corresponding to the feature area 1101 is expanded from the initial state because the feature area 1101 was determined as a main object area candidate in step S606.

In step S1003, the system control unit 50 determines whether or not the gaze point detected in step S501 is included in any of the selection determining areas set in step S503. In a case where it is determined that the gaze point is included in any selection determining area, the flow proceeds to step S1004; otherwise, the flow proceeds to step S1005.

In step S1004, the system control unit 50 selects the feature area corresponding to the selection determining area determined to include the gaze point in step S1003 as the main object area. In a case where the gaze point is included in a plurality of selection determining areas, the selection determining area having the largest size ratio to the corresponding feature area is selected among the selection determining areas including the gaze points. This is because, in setting the selection determining area in step S503, adjustment is made so as to expand the selection determining area corresponding to the feature area that is highly suitable as the main object.

For example, in FIG. 11B, since the gaze point 1105 is included only in the selection determining area 1103, the feature area 1101 corresponding to the selection determining area 1103 is selected as the main object area. In FIG. 11C, gaze point 1105 is included in both the selection determining areas 1103 and 1104 corresponding to the feature areas 1101 and 1102. In this case, since the selection determining area 1103 has a larger size ratio to the feature area, the feature area 1101 corresponding to the selection determining area 1103 is selected as the main object area.

In step S1005, since the gaze point is not included in any feature area or selection determining area, the system control unit 50 does not select a main object area and sets no main object area.

In FIG. 11D, since the gaze point 1105 is not included in any of the feature areas 1101 and 1102 and the selection determining areas 1103 and 1104, no main object area is set.

As described above, the configuration of this embodiment enables the user to select an intended object in a case where the user selects an object using his visual line.

Second Embodiment

This embodiment will discuss a method for selecting a main object that is consistent with the intention of the user in the object selection with the visual line input using means different from that of the first embodiment. An outline of this means is a method of setting the priority for object selection determination to a feature area, and of enabling a proper feature area to be selected even in a case where the selection determining areas overlap each other.

The basic configuration of the image pickup apparatus according to this embodiment is similar to that of the image pickup apparatus according to the first embodiment. A difference between this embodiment and the first embodiment is a method of selecting a main object using visual line input from step S501 to step S506 in FIG. 5, and the rest of the configuration is common. This embodiment will discuss only a configuration different from that of the first embodiment, and will omit a description of the same configuration.

Figure 12:
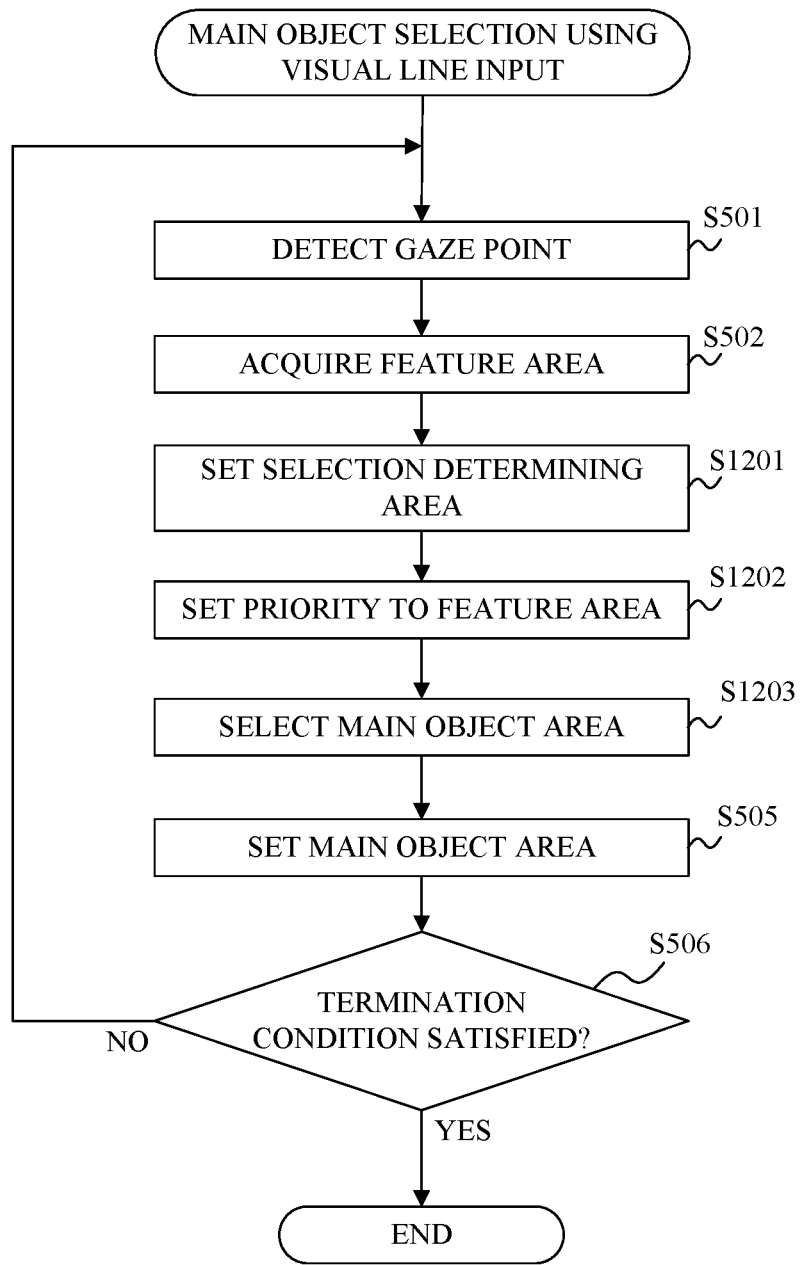
FIG. 12 is a flowchart illustrating main object selection processing using visual line input according to a second embodiment.

FIG. 12 is a flowchart illustrating main object selection processing using visual line input according to this embodiment. Those steps, which are corresponding to steps in FIG. 5 in the first embodiment, will be designated by the same reference numerals, and a description thereof will be omitted.

In step S1201, the system control unit 50 sets a selection determining area for each feature area acquired in step S502. The size of the selection determining area to be set is a size obtained by enlarging the corresponding feature area by a predetermined ratio.

In step S1202 (setting step), the system control unit 50 (setting unit 50c) sets the priority that serves as a criterion for main object selection for the feature area acquired in step S502.

In step S1203, the system control unit 50 determines whether or not the gaze point detected in step S501 is included in any feature area or selection determination areas, and selects the main object area from the feature area acquired in step S502 based on the determination result.

Figure 13:
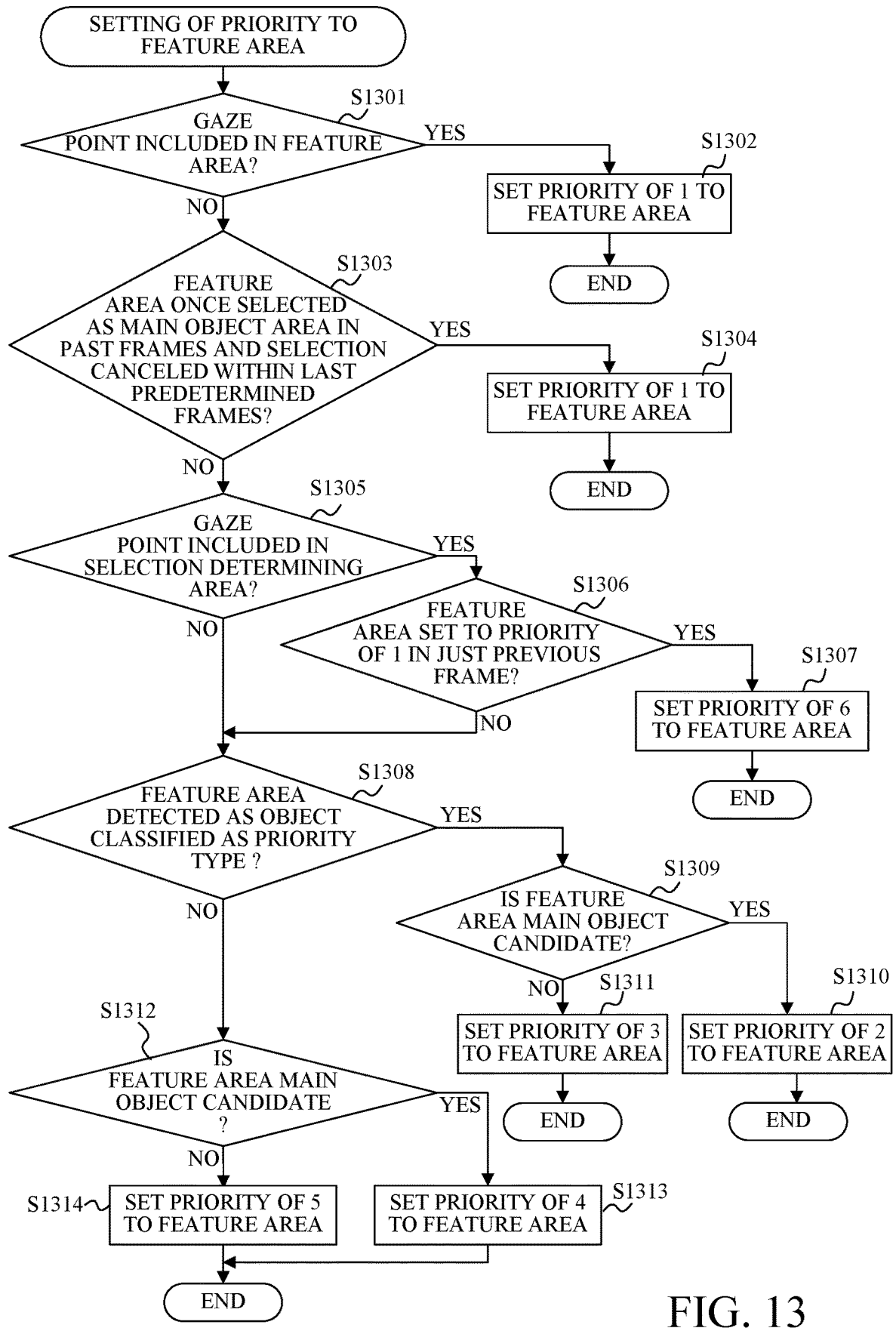
FIG. 13 is a flowchart illustrating priority setting processing relative to a feature area according to the second embodiment.

FIG. 13 is a flowchart illustrating priority setting processing for feature areas in step S1202. The processing in FIG. 13 is executed for each feature area acquired in step S502. Priority of 1 is the highest priority and priority of 6 is the lowest priority.

In step S1301, the system control unit 50 determines whether or not the gaze point detected in step S501 is included in the feature area. In a case where it is determined that the gaze point is included in the feature area, the flow proceeds to step S1302; otherwise, the flow proceeds to step S1303.

In step S1302, the system control unit 50 sets the priority of 1 to the feature area.

In step S1303, the system control unit 50 determines whether or not the feature area was once selected as the main object area in the past frame and then the selection was canceled within the last predetermined frames. The processing of this step is executed so as to lower the priority of the canceled feature area, because the user is highly likely to wish to select a feature area different from the feature area of the canceled selection in a case where the user selected the feature area again just after the user intentionally canceled the selection of the feature area. In a case where it is determined that the feature area was once selected as the main object area in the past frame and then the selection was canceled within the last predetermined frames, the flow proceeds to step S1303. In a case where it is determined otherwise, the flows proceeds to step S1305.

In step S1304, the system control unit 50 sets the priority of 6 to the feature area.

In step S1305, the system control unit 50 determines whether or not the gaze point detected in step S501 is included in the selection determining area corresponding to the feature area. In a case where it is determined that the gaze point is included in the selection determining area, the flow proceeds to step S1306; otherwise, the flow proceeds to step S1308.

In step S1306, the system control unit 50 determines whether or not the feature area was set to the priority of 1 in the just previous frame. The processing of this step is executed so as to continue to set the priority of 1, while the gaze point moves out of the selection determining area corresponding to the feature area for the feature area once set to the priority of 1 in step S1302. In a case where it is determined that the feature area was set to the priority of 1 in the just previous frame, the flow proceeds to step S1307; otherwise, the flow proceeds to step S1308.

In step S1307, the system control unit 50 sets the priority of 1 to the feature area.

In step S1308, the system control unit 50 acquires the setting of the priority type 401, and determines whether the feature area is an area detected as an object classified as the priority type. In a case where the feature area is determined to be the area detected as the object classified as the priority type, the flow proceeds to step S1309; otherwise, the flow proceeds to step S1312.

In step S1309, the system control unit 50 determines whether or not the feature area is a main object candidate. The main object candidate includes, for example, a person previously registered in the body 100, a person holding a ball in a sports scene, or an object that has been continuously framed for a predetermined time or longer. In a case where the feature area is determined to be a main object candidate, the flow proceeds to step S1310; otherwise, the flow proceeds to step S1311.

In step S1310, the system control unit 50 sets priority of 2 to the feature area.

In step S1311, the system control unit 50 sets priority of 3 to the feature area.

In step S1312, the system control unit 50 determines whether or not the feature area is a main object candidate. In a case where the feature area is determined to be a main object candidate, the flow proceeds to step S1313; otherwise, the flow proceeds to step S1314.

In step S1313, the system control unit 50 sets priority of 4 to the feature area.

In step S1314, the system control unit 50 sets priority of 5 to the feature area.

Figure 14:
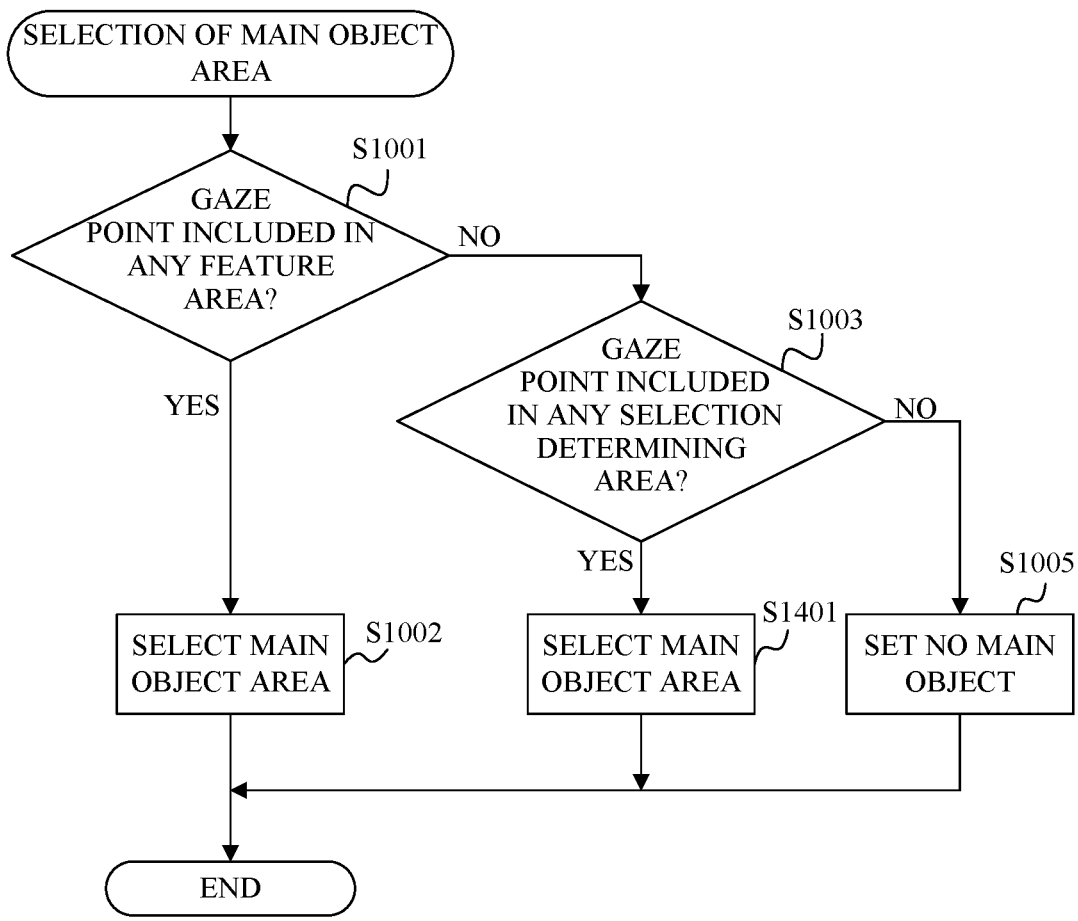
FIG. 14 is a flowchart illustrating selection processing of the main object area according to the second embodiment.

FIG. 14 is a flowchart illustrating the main object area selection processing according to this embodiment. Those steps, which are corresponding steps in FIG. 10 in the first embodiment, will be designated by the same reference numerals as those in FIG. 10, and a description thereof will be omitted.

In step S1401, the system control unit 50 refers to the priority set in step S1202 for the feature area corresponding to the selection determining area including the gaze point, and selects the feature area with the highest priority as the main object area. In a case where there are a plurality of feature areas with the highest priority, a distance between the edge of each feature area and the gaze point is compared, and the closest feature area is selected as the main object area.

As described above, the configuration according to this embodiment can set high the priority of the feature area that is likely to be the main object intended by the user, such as the feature area that the user is gazing at and the feature area that is suitable for the imaging condition. Even if the selection determining areas overlap each other, object selection that is highly likely suitable for the intention of the user can be performed based on the priority.

Third Embodiment

This embodiment will discuss a method of selecting a main object suitable for the intention of the user in object selection using visual line input by combining the means of the first and second embodiments.

The basic configuration of the image pickup apparatus according to this embodiment is similar to the image pickup apparatuses according to the first and second embodiments. A difference between this embodiment and the first and second embodiments is a method of selecting the main object using visual line input from step S501 to step S506 in FIG. 5, and other configurations are the same. This embodiment will discuss only a configuration different from that of each of the first and second embodiments, and will omit a description of the same configuration.

Figure 15:
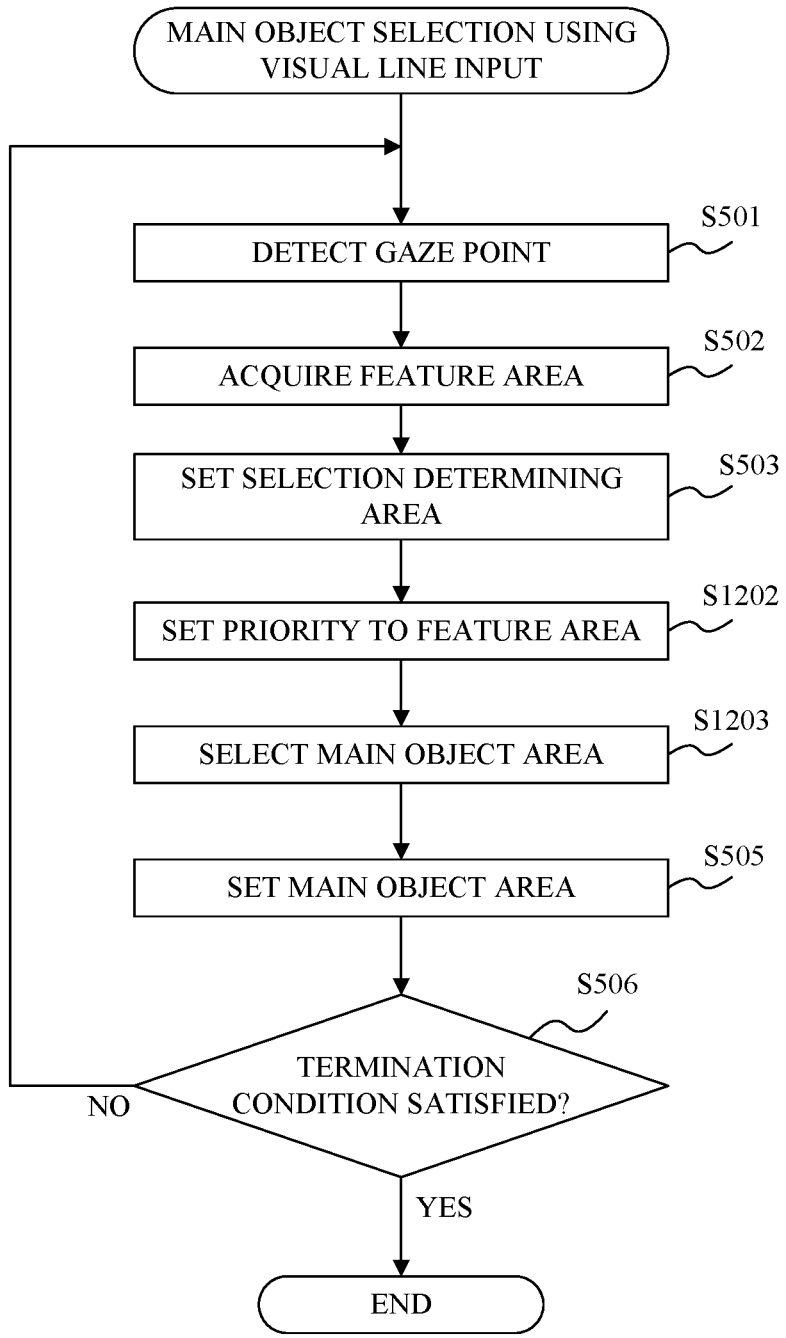
FIG. 15 is a flowchart illustrating main object selection processing using visual line input according to a third embodiment.

FIG. 15 is a flowchart illustrating main object selection processing using visual line input in this embodiment. Those steps, which are corresponding steps in FIGS. 5 and 12 in the first and second embodiments, will be designated by the same reference numerals as those in FIGS. 5 and 12, and a description thereof will be omitted.

In the main object selection using visual line input in this embodiment, in setting the selection determining area in step S503, the selection determining area is set and adjusted based on the gaze point detected in step S501, the feature area obtained in step S502, and the imaging condition.

Similarly to the second embodiment, the priority of each feature area is set in step S1202 and a main object area is selected based on the priority in step S1203.

As described above, the configuration of this embodiment adjusts the size of the selection determining area, and selects the main object area based on the priority in a case where the gaze point is included in a plurality of selection determining areas. This configuration enables a main object to be selected, which is suitable for the intention of the user.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-114914, filed on Jul. 19, 2022, which is hereby incorporated by reference herein in its entirety.

What is claimed is:

1. A control apparatus comprising:
a memory storing instructions; and
a processor configured to execute the instructions to:
   detect a gaze point of a user on an image based on a visual line of the user,
   acquire at least one feature area detected using the image,
   set at least one selection determining area each corresponding to one of the one feature area,
   select as a main object area a first feature area among the at least one feature area in a case where the gaze point is included in the first feature area,
   select as the main object area a second feature area corresponding to one selection determining area including the gaze point in a case where the gaze point is not included in the at least one feature area and the gaze point is included in the at least one selection determining area,
   set a condition in selecting the main object area using information on the at least one feature area,
   set a size of the at least one selection determining area using the information on the at least one feature area, and
   reduce a selection determining area corresponding to the first feature area in a case where the processor selects the first feature area and then cancels selection of the first feature area within a predetermined time.

2. The control apparatus according to claim 1, wherein the processor is configured to expand a selection determining area corresponding to a third feature area among the at least one feature area in a case where a type of the third feature area is a type of an object selected by the user.

3. The control apparatus according to claim 1, wherein the processor is configured to reduce a selection determining area corresponding to a third feature area among the at least one feature area in a case where a type of the third feature area is not a type of an object selected by the user.

4. The control apparatus according to claim 1, wherein the processor is configured to expand a selection determining area corresponding to a third feature area among the at least one feature area in a case where the third feature area includes a preset object.

5. The control apparatus according to claim 1, wherein the processor is configured to expand a selection determining area corresponding to a third feature area among the at least one feature area in a case where the gaze point is included in the third feature area.

6. The control apparatus according to claim 1, wherein the at least one selection determining area includes a first selection determining area and a second selection determining area, and
wherein the processor is configured to expand the first selection determining area so that the first selection determining area and the second selection determining area do not overlap each other.

7. The control apparatus according to claim 1, wherein the at least one selection determining area includes a plurality of selection determining areas, and
wherein in a case where the gaze point is included in the plurality of selection determining areas in selecting the second feature area, the processor is configured to determine a selection determining area having a largest size ratio to a corresponding feature area among the plurality of selection determining areas as the one selection determining area.

8. The control apparatus according to claim 1, wherein the processor is configured to set priority of the at least one feature area that is used to select the second feature area using the information on the at least one feature area.

9. The control apparatus according to claim 8, wherein the at least one selection determining area includes a plurality of selection determining areas, and
wherein in a case where the gaze point is included in the plurality of selection determining areas in selecting the second feature area, the processor is configured to determine the one selection determining area according to priority of a corresponding feature area among the plurality of selection determining areas.

10. The control apparatus according to claim 8, wherein the at least one feature area includes a third feature area whose type is a type of an object selected by the user, and a fourth feature area whose type is not a type of the object selected by the user, and
wherein the processor is configured to set priority of the third feature area higher than that of the fourth feature area.

11. The control apparatus according to claim 8, wherein the at least one feature area includes a third feature area that includes the gaze point and a fourth feature area that does not include the gaze point, and
wherein the processor is configured to set priority of the third feature area higher than that of the fourth feature area.

12. The control apparatus according to claim 8, wherein in a case where the gaze point is included in a third feature area among the at least one feature area, thus the processor sets priority of the third feature area to a first priority, and then the gaze point is no longer included in a selection determining area corresponding to the third feature area, the processor is configured to set the priority of the third feature area to a second priority lower than the first priority.

13. The control apparatus according to claim 8, wherein the at least one feature area includes a third feature area that includes a preset object, and a fourth feature area that does not include the preset object, and
wherein the processor is configured to set priority of the third feature area higher than that of the fourth feature area.

14. The control apparatus according to claim 8, wherein the at least one feature area includes a plurality of feature areas, and
wherein in a case where the processor selects the first feature area and then cancels selection of the first feature area within a predetermined time, the processor is configured to set priority of the first feature area to be lower than that of a feature area different from the first feature area.

15. An image pickup apparatus comprising:
a control apparatus; and
an image sensor,
wherein the control apparatus includes:
a memory storing instructions; and
a processor configured to execute the instructions to:
    detect a gaze point of a user on an image based on a visual line of the user,
    acquire at least one feature area detected using the image,
    set at least one selection determining area each corresponding to one of the one feature area,
    select as a main object area a first feature area among the at least one feature area in a case where the gaze point is included in the first feature area,
    select as the main object area a second feature area corresponding to one selection determining area including the gaze point in a case where the gaze point is not included in the at least one feature area and the gaze point is included in the at least one selection determining area,
    set a condition in selecting the main object area using information on the at least one feature area,
    set a size of the at least one selection determining area using the information on the at least one feature area, and
    reduce a selection determining area corresponding to the first feature area in a case where the processor selects the first feature area and then cancels selection of the first feature area within a predetermined time.

16. A control method comprising the steps of:
detecting a gaze point of a user on an image based on a visual line of the user;
acquiring at least one feature area detected using the image;
setting at least one selection determining area each corresponding to one of the one feature area,
selecting as a main object area a first feature area among the at least one feature area in a case where the gaze point is included in the first feature area,
selecting as the main object area a second feature area corresponding to one selection determining area including the gaze point in a case where the gaze point is not included in the at least one feature area and the gaze point is included in the at least one selection determining area, and
setting a condition in selecting the main object area using information on the at least one feature area,
setting a size of the at least one selection determining area using the information on the at least one feature area, and
reducing a selection determining area corresponding to the first feature area in a case where the processor selects the first feature area and then cancels selection of the first feature area within a predetermined time.

17. A non-transitory computer-readable storage medium storing a program that causes a computer to execute the control method according to claim 16.

* * * * *